(12) United States Patent
Lateb et al.

(10) Patent No.: US 11,982,498 B2
(45) Date of Patent: May 14, 2024

(54) FIN AND INSERT COOLING DEVICE (71) Applicant: THALES, Courbevoie (FR)

(72) Inventors: Ramdane Lateb, Chatou (FR);
Jose-Carlos Magno, Chatou (FR)

(73) Assignee: THALES, Courbevoie (FR)

( * ) Notice: Subject to any disclaimer, the term of this patent is extended or adjusted under 35 U.S.C. 154(b) by 84 days.

(21) Appl. No.: 17/119,913

(22) Filed: Dec. 11, 2020

(65) Prior Publication Data

US 2021/0194326 A1 Jun. 24, 2021

(30) Foreign Application Priority Data

Dec. 20, 2019 (FR) ...................................... 1915037

(51) Int. Cl.
*F28F 1/14* (2006.01)
*H02K 9/02* (2006.01)
*H02K 9/19* (2006.01)
*H02K 9/22* (2006.01)

(52) U.S. Cl.
CPC ................. *F28F 1/14* (2013.01); *H02K 9/02* (2013.01); *H02K 9/225* (2021.01); *H02K 9/19* (2013.01)

(58) Field of Classification Search
CPC ................. F28F 1/14; H02K 9/19; H02K 9/02
See application file for complete search history.

(56) References Cited

U.S. PATENT DOCUMENTS

| 5,024,300 A * | 6/1991 | Miller .................. F16D 65/128 188/71.6 |
| 5,207,674 A * | 5/1993 | Hamilton ................ F25B 21/02 606/23 |
| 2003/0089486 A1 | 5/2003 | Parish et al. |

(Continued)

FOREIGN PATENT DOCUMENTS

DE 2717147 A1 * 11/1978
EP 2 770 253 A1 8/2014

(Continued)

OTHER PUBLICATIONS

Noda (JP 02166390 A) English Translation (Year: 1990).*
Garzmann (DE 2717147 A1) English Translation (Year: 1978).*

*Primary Examiner* — Tulsidas C Patel
*Assistant Examiner* — Robert E Mates
(74) *Attorney, Agent, or Firm* — BakerHostetler (57) ABSTRACT

A cooling device having a surface configured to allow the circulation of a heat-transfer fluid along the surface in a first direction D1, an exchange of heat being able to take place by convection between the cooling device and the fluid, the device includes n cooling fins, n being an integer greater than or equal to one, each cooling fin forming a protuberance of the device, extending primarily in a plane (P) containing the first direction (D1), in each fin, at least two inserts having a tube form and a dimension characteristic of a section of the tube and extending primarily in a second direction (D2) of the plane P distinct from the first direction (D1), the inserts having, over their greater length, a thermal resistance lower (Continued)

than the thermal resistance of the cooling fin along the same length, each insert being distant in the first direction (D1) from another insert by a length equal to or greater than the characteristic dimension of the section of the tube of the insert.

11 Claims, 7 Drawing Sheets

(56) References Cited

U.S. PATENT DOCUMENTS

2008/0062651 A1    3/2008  Reis et al.
2016/0156250 A1*   6/2016  Jost ..................... B60L 3/0061
                                                            310/59

FOREIGN PATENT DOCUMENTS

FR        2 861 913  A1    5/2005
JP          02166390  A  *  6/1990   ............. F28D 15/02

* cited by examiner

FIN AND INSERT COOLING DEVICE

CROSS-REFERENCE TO RELATED APPLICATIONS

This application claims priority to foreign French patent application No. FR 1915037, filed on Dec. 20, 2019, the disclosure of which is incorporated by reference in its entirety.

FIELD OF THE INVENTION

The invention relates to the cooling of an element producing heat. The invention is applicable in the field of electrical machines and power electronics. Indeed, it is known that electrical elements and power electronics generate losses which are reflected by a production of heat which has to be dissipated. The dissipation of this heat, guaranteeing good operation of the abovementioned elements, therefore becomes a priority. The invention is particularly applicable in the field of aeronautics in which the trend is to increase the quantity of electrical equipment and therefore the electrical power onboard.

BACKGROUND

As stated previously, electrical machines can generate a lot of heat. Furthermore, the cooling required to dissipate this heat is limited by certain constraints. The bulk and the weight added by a possible cooling device are notably limited by the specifics of a vehicle with an electrical machine embedded. For example, for vertical take-off and landing aircraft, electrical or hybrid, it is desirable to obtain a device capable of cooling the electrical elements that has a low weight and is compact.

There are many devices that allow electrical machines to be cooled. Two approaches are these days distinguished:

The first approach making it possible to resolve this problem of cooling of the electrical elements relies on the use of a flow of air capable of dissipating the heat by convection. The cooling device, according to this first approach, takes the form of a heat sink provided with fins capable of exchanging heat with the electrical machine. The flow of air sweeping the electrical machine then exchanges thermally with these fins, which receive the heat originating from the electrical machine. However, this solution is limited by the maximum quantity of heat that this device can dissipate. Thus, to increase the cooling capabilities of this type of device, it is necessary to increase the bulk of the device, which does not seem optimal.

Another approach focuses more on the use of a coolant circulating in channels of the electrical machine. The fluid absorbs the heat generated by the electrical machine. Outside the electrical machine, the fluid circulates in an exchanger that allows the fluid to be cooled. The heat-transfer fluid is chosen to have a significant heat capacity. The cooling of the electrical machine is thereby enhanced. However, the bulk added around the electrical machine via the exchangers, the circulation pump and the fluid makes this approach more complicated and less desirable for a person skilled in the art seeking to lighten his or her vehicle.

Consequently, the cooling of an electrical machine is these days limited by constraints of weight and bulk that the prior art is not capable of overcoming.

It is therefore necessary to obtain an efficient cooling means of reduced weight and bulk.

For this, the invention proposes taking up the first approach and improving the efficiency thereof. To this end, the invention proposes combining cooling fins and heat pipes.

SUMMARY OF THE INVENTION

More specifically, the subject of the invention is a cooling device having a surface configured to allow the circulation of a heat-transfer fluid along the surface in a first direction, an exchange of heat being able to take place by convection between the cooling device and the fluid, the device comprising:
  n cooling fins, n being an integer greater than or equal to one, each cooling fin forming a protuberance of the device, extending primarily in a plane containing the first direction,
  at least one insert extending primarily in a second direction of the plane distinct from the first direction, the insert having, over its greater length, a thermal resistance lower than the thermal resistance of the cooling fin along the same length.

According to one aspect of the invention, the insert is a heat pipe.

According to one aspect of the invention, the insert has a tube form and in which a characteristic dimension of a section of the tube is greater than a thickness of the corresponding cooling fin defined outside of a section of the cooling fin at right angles to the first direction and passing through the insert.

According to one aspect of the invention, the n cooling fins, n being an integer greater than or equal to two, extend along the same abscissae in the first direction and along different ordinates on an axis of the section, the inserts having the same abscissa in the first direction.

According to one aspect of the invention, then cooling fins each comprising at least one insert extend along the same abscissae in the first direction and a different ordinate along an axis of the section, the inserts having an abscissa offset by a length greater than or equal to the characteristic dimension of the section of the inserts in the first direction.

According to one aspect of the invention, the insert is embedded in the cooling fin accommodating it.

According to one aspect of the invention, the greater length of the insert is equal to or greater than a greater length of the cooling fin in a section of the cooling fin at right angles to the first direction.

According to one aspect of the invention, the cooling fin has a smaller section at the end.

According to one aspect of the invention, several of the n cooling fins are aligned in the first direction.

According to one aspect of the invention, the cooling device comprises:
  a first cooling fin extending along an abscissa in the first direction and an ordinate along an axis of the section,
  a second cooling fin extending along the abscissa in the first direction and an ordinate different from the first cooling fin along the axis of the section,
  one of the n, n being an integer greater than or equal to three, cooling fins comprising at least one insert disposed in the cooling fin and extending in the second direction, the cooling fin having an ordinate lying between the ordinates of the first and the second cooling fins along the axis of the section.

According to one aspect of the invention, a thermal grease is applied between the insert and the corresponding cooling fin.

According to one aspect of the invention, the electrical machine comprises a field frame on which windings bear and equipped with the cooling device.

BRIEF DESCRIPTION OF THE DRAWINGS

The invention will be better understood and other advantages will become apparent on reading the detailed description of an embodiment given by way of example, the description being illustrated by the attached drawing in which.

In the interests of clarity, the same elements will bear the same references in the different figures.

DETAILED DESCRIPTION

In the present description, a direction D1 is defined by the direction of a flow of air 12 directed by a dedicated propeller or fan wheel.

Figure 1:
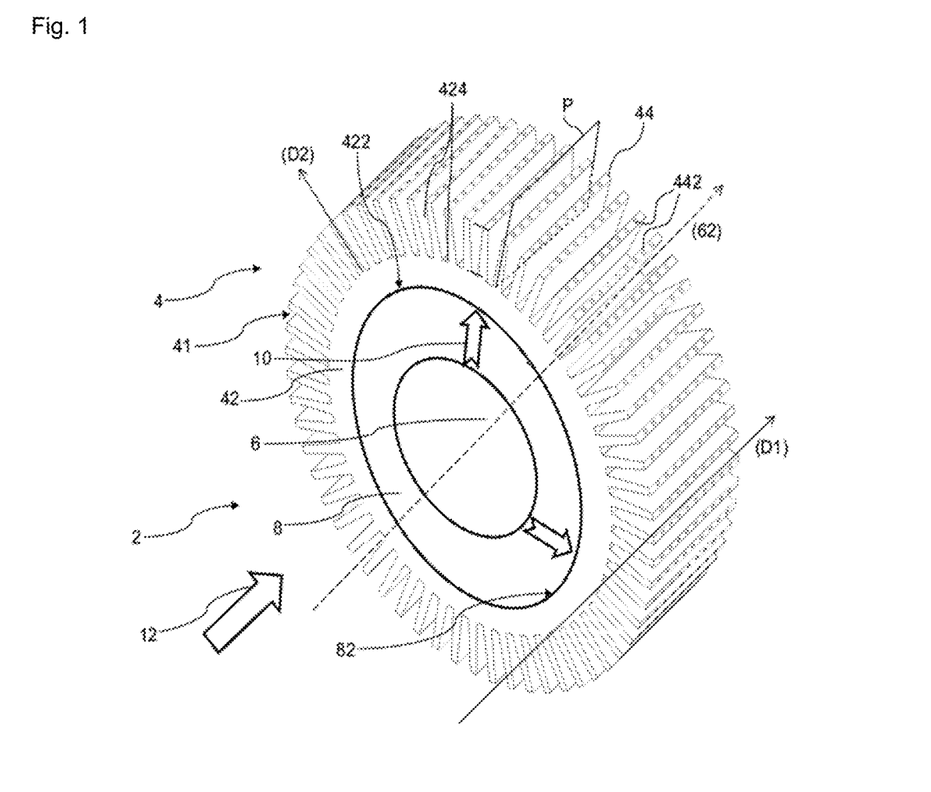
FIG. 1 represents an electrical machine provided with a cooling device according to the invention.

FIG. 1 represents an electrical machine 2 provided with a cooling device 4. It is possible to implement the invention with any other type of heat source, with or without rotating parts, whether this heat source is electrical or mechanical. Generally, an electrical machine 2 capable of generating power is composed of a moving part or rotor 6 rotating about an axis 62 and a fixed part or stator 8. During these phases of production of electrical power in generator mode, or mechanical power in motor mode, losses 10 are generated in the form of heat that has to be dissipated.

The cooling device 4, intended to dissipate this heat, is formed by a tubular heat sink 41, produced for example in an aluminium alloy. The heat sink 41 comprises cooling fins 44 that are substantially flat. Each cooling fin 44 extends primarily in a plane P containing the direction D1. Each cooling fin 44 extends also in a radial direction D2 with respect to the axis of rotation 62 of the rotor 6. In the example represented, the direction D2 is at right angles to the direction D1. In other words, the plane P is defined by D1 and D2. There is therefore a plane P for each cooling fin 44, since each direction D2 is specific to its cooling fin 44. The cooling fins 44 take the form of thin rectangular or trapezoidal blades that are run over in their lengthwise direction by a flow of air 12 in the direction D1.

The heat sink 41 comprises a tubular base 42 from which emerge the cooling fins 44. The outer surface of the base 42 and of the cooling fins 44 forms a heat exchange surface 424 between the heat sink 41 and the flow of air 12. An inner surface 422 of the base 42 of the heat sink 41 is in contact with an outer wall 82 of the stator 8. The cooling device 4 encloses the electrical machine 2 by being secured to the outer wall 82 of the stator 8.

In this way, the dissipation of the heat 10 generated by the electrical machine 2 takes place in the outward direction, that is to say radially with respect to the axis of rotation 62 of the rotor 6. The heat 10 is dissipated in the direction D2, first of all by conduction at the point of contact between the outer wall 82 of the stator 8 and the inner surface 422 of the base 42, then, still by conduction within the heat sink 41, from its base 42 to its cooling fins 44 and finally by convection between the heat sink 41 and the flow of air 12 at the heat exchange surface 424.

In the present invention, each cooling fin 44 comprises at least one heat pipe 9 extending primarily in a third direction D3 of the plane P distinct from the direction D1. In the example represented, the third direction D3 coincides with the direction D2. It is also possible to arrange the heat pipes 9 extending in a third direction D3 that is inclined with respect to the direction D2, the third direction D3 of each heat pipe 9 remaining distinct from the direction D1. To arrange each heat pipe 9, the cooling fin 44 concerned comprises, in its length L defined in the direction D2, one or more accommodating enclosures 442 in each of which there is inserted a heat pipe 9 that are represented more specifically in FIGS. 2a and 2b. In the example represented, each cooling fin 44 comprises several accommodating enclosures 442 aligned in the direction D1 of the flow of air 12. The heat pipes 9 can take any bar form.

A heat pipe is a hermetic enclosure enclosing a fluid in the state of equilibrium. The heat pipe is a heat conductor which allows the heat to be guided between its two ends via changes of state of the fluid inside the heat pipe. More specifically, in fact, the vaporization of the fluid in the liquid state, inside the heat pipe, allows the absorption of thermal energy emitted by a heat source which is transferred, following the circulation of this same vapour within the heat pipe, to a dissipation zone where the fluid reverts to its initial state by condensation. The heat pipes 9 can be heat pipes available on the market.

More generally, the heat pipe 9 forms an insert whose thermal resistance is lower than that of the heat sink 41. In the context of the invention, it is possible to replace the heat pipe with a bar produced in a material whose thermal conductivity is greater than that of the material in which the heat sink 41 is produced. As an example, the insert can be formed by a copper bar inserted into a heat sink made of aluminium alloy. Advantageously, it is possible to envisage placing inserts with a density lower than that of the cooling fins 44 in order to lighten the cooling device 4. For example, the use of inserts made of aluminium alloy in a heat sink made of steel would favour the heat exchanges and would significantly reduce the weight of the cooling device 4.

Figure 2A:
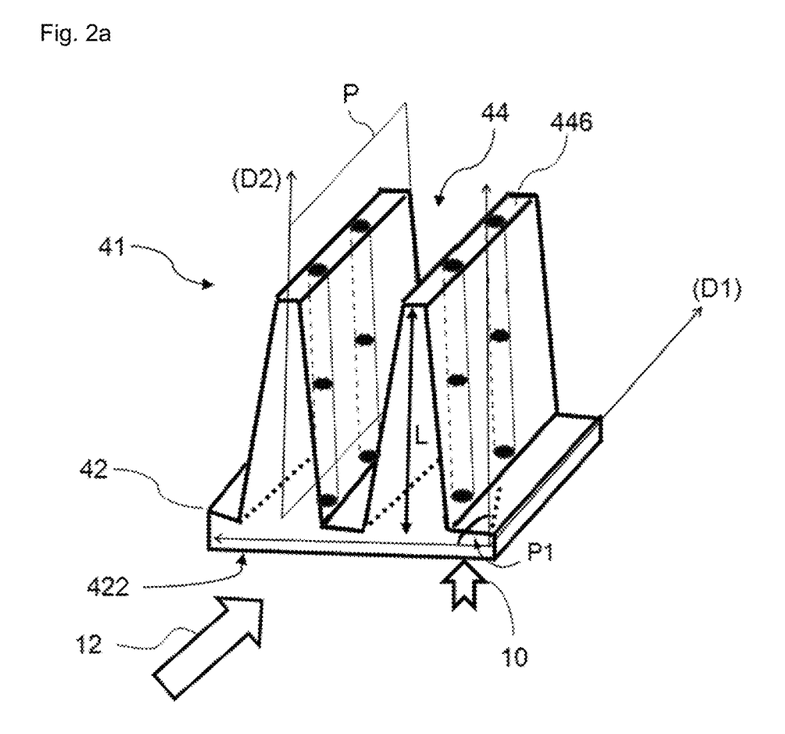
FIGS. 2a and 2b represent a view focused around two cooling fins of the cooling device.
Figure 2B:
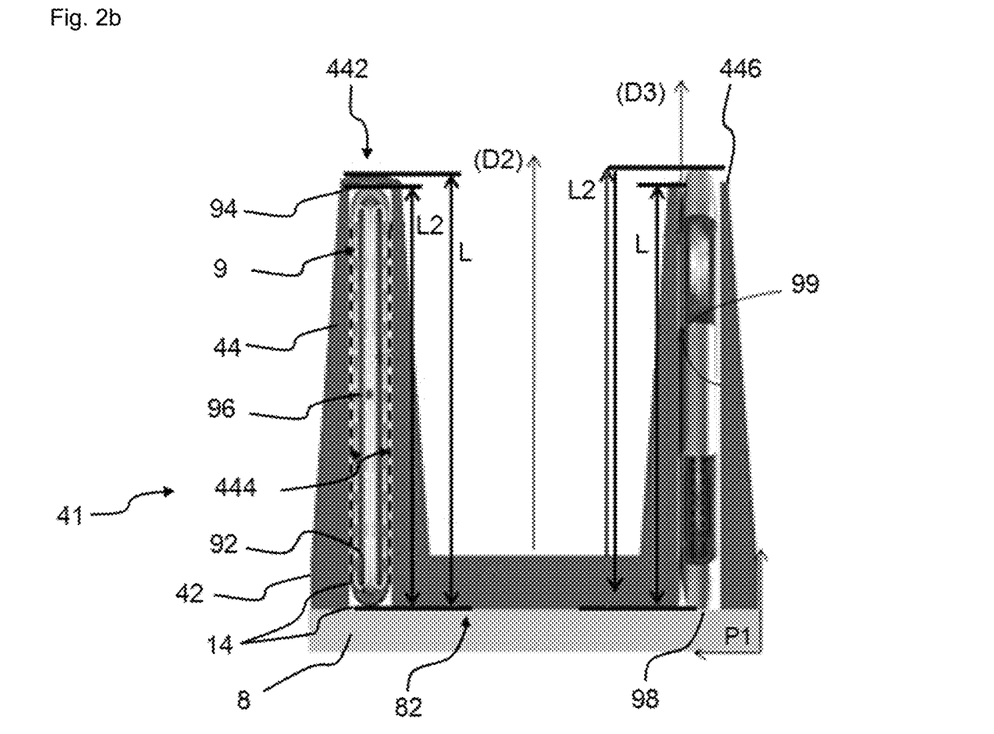

FIGS. 2a and 2b represent a view focused around two cooling fins 44 of the cooling device 4. In FIG. 2a, the two cooling fins 44 each comprise two heat pipes 9. In FIG. 2b, the two cooling fins 44 are represented in cross section through a plane P1 defined as a plane passing through the heat pipes 9 at right angles to the direction D1.

The cooling fins 44 and the base 42 form the heat sink 41, advantageously in a single piece. The heat sink 41 can be obtained in different ways, such as moulding or material removal for example.

The heat pipes 9 essentially comprise an evaporation zone 92 at a first end, intended to be disposed in proximity to the heat zone, that is to say as close as possible to the outer wall 82 of the stator 8, a condensation zone 94 at the second end, intended to facilitate the heat exchange with the flow of air 12 and a transition zone 96 between the evaporation zone 92 and the condensation zone 94. In the example represented, the heat pipes 9 have a cylindrical form around their third direction D3. The heat pipes 9 have a length L2 defined in the third direction D3. The length L2 represents the greatest length of the heat pipe 9 considered.

As stated previously, the heat pipes 9 can take any bar or tube form. The accommodating enclosure 442, which comprises lateral edges 444, represented in FIG. 2b, is in direct contact with the heat pipe 9 accommodating it. Thus, in order to maximize the contact between the heat pipe 9 and the accommodating enclosure 442 via the lateral edges 444, the lateral edges 444 take a form similar to the form of the heat pipes 9. Thus, for heat pipes 9 that have a cylindrical form, the lateral edges 444 take a circular form giving the accommodating enclosure 442 the form of a hollow cylinder capable of accommodating the heat pipe of cylindrical form. For the case of a heat pipe 9 of parallelepipedal form, the accommodating enclosure 442 that relates to it takes the appropriate form allowing the accommodation of this parallelepipedal heat pipe 9 while maximizing the direct contact. Thus, each heat pipe 9 is inserted into the accommodating enclosure 442 that relates to it.

On the left-hand part of FIG. 2b, the heat pipe 9 has a length L2 less than the length L of the corresponding cooling fin 44. In other words, the heat pipe 9 is embedded in the cooling fin 44. That makes it possible to prevent potential contact between the heat pipe 9 and outside elements carried by the flow of air 12 which could damage, or even destroy, the condensation zone 94. The cooling fin 44 then becomes a protective carapace of the heat pipe 9 inserted into the corresponding cooling fin 44.

Alternatively, as represented on the right-hand part of FIG. 2b, the heat pipe 9 can have a length L2 equal to or greater than the length L of the corresponding cooling fin 44. In other words, the condensation zone 94 of the heat pipes 9 extends beyond the top end 446 of the corresponding cooling fin 44. The condensation zone 94 is then in immediate contact with the flow of air 12, which enhances the heat exchange with the flow of air 12.

Nevertheless, the heat pipes 9 of tubular form, that have a length L2 greater than the length L of the corresponding cooling fin 44 and that extend in the third direction D3, are and remain embedded in the corresponding cooling fin 44 over a greater proportion of their length L2 in the third direction D3 of each heat pipe 9. More specifically, the length L of the cooling fin 44 is at least equal to half the length L2 of the accommodated heat pipe 9. That way, the rigid structure of the cooling fins 44 ensures protection of the heat pipes 9 which are fragile exchangers.

Furthermore, in order to avoid having air imprisoned between the heat pipes 9, the accommodating enclosures 442 of the cooling fins 44 and the outer wall 82 of the stator 8, which can be a brake to the heat exchanges, a thermal grease 14 is applied around the contact zones, that is to say around the point of contact 98 between the heat pipes 9 and the outer wall 82 of the stator 8 and on lateral edges 444 of the accommodating enclosures 442, an edge in direct contact with the lateral walls 99 of the heat pipes 9. The thermal grease 14 thus allows the effect of galvanic corrosion between the heat pipes 9, the accommodating enclosures 442 of the cooling fins 44 and the outer wall 82 of the stator 8 to be limited.

Indeed, since the heat pipes 9, the heat sink 41 and the stator 8 are not necessarily obtained from the same material, it is possible for a corrosion phenomenon to occur, which would be damaging to the correct operation of the cooling device 4. The presence of the thermal grease 14 thus allows a free choice of the materials in contact, notably for the heat pipe 9 and the cooling fin 44 which accommodates it.

Figure 3A:
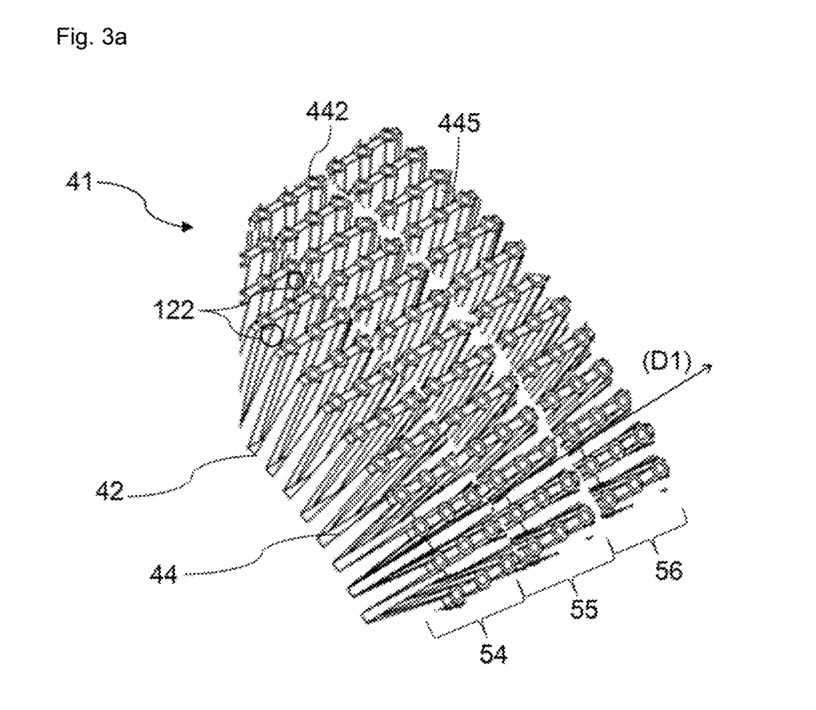
FIG. 3a represents a second embodiment of the cooling device.

FIG. 3a represents a second embodiment of the cooling device 4 in which several cooling fins 44 are aligned on the base 42 of the heat sink 41 in the direction D1 of the flow of air 12. The second embodiment allows the heat exchange zone between the heat sink 41 and the flow of air 12 to be increased. This second embodiment is described more particularly in FIG. 3b.

Figure 3B:
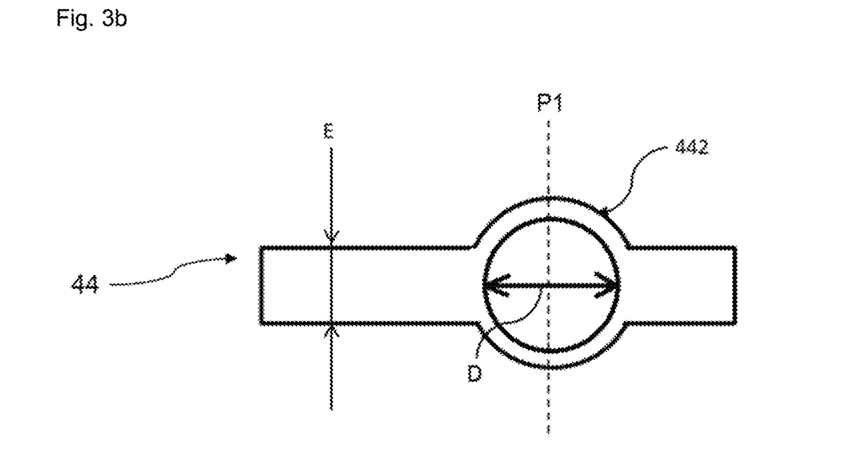
FIG. 3b represents a focused view of an accommodating enclosure according to the second embodiment of the cooling device.

FIG. 3b is a view focused on the accommodating enclosure 442, according to the second embodiment, intended to accommodate a heat pipe 9. In FIG. 3b, a characteristic dimension of the section of the heat pipe 9, that is to say a diameter D of the heat pipe 9, in the case of heat pipes of tubular form, is greater than a thickness E of the corresponding cooling fin 44 defined outside of the section P1 of the cooling fin. Thus, the accommodating enclosures 442 form a protuberance 445 of the cooling fins 44 in a direction substantially at right angles to the direction D1 of the flow of air 12. This protuberance 445 allows the flow of air 12 to be locally modified and thus local turbulences 122 to be generated around the protuberances 445 which significantly increase the heat exchanges between the cooling fins 44 and the flow of air 12 running along them. Alternatively, as represented in FIG. 1, the diameter D of the heat pipes is less than any thickness of the cooling fins 44. That makes it possible to prevent any pressure drop in the circulation of the flow along the cooling fin 44.

Furthermore, each accommodating enclosure 442 of a cooling fin 44 is spaced apart from another adjacent accommodating enclosure 442 on this same cooling fin 44 by a length at least equal to the characteristic dimension of the section of the tube of the heat pipe 9, namely the diameter. Preferentially, each accommodating enclosure 442 of a cooling fin 44 is spaced apart from another adjacent accommodating enclosure 442 on this same cooling fin 44 by a length greater than the characteristic dimension of the section of the tube of the heat pipe 9. Thus, each heat pipe 9 is distant in the first direction D1 from another heat pipe 9 by a length equal to or greater than the characteristic dimension of the section of the tube of the heat pipe 9. This spaced-apart disposition of the heat pipes 9 in the cooling fins 44 allows the heat exchanges to be augmented between the cooling fins 44 and the flow of air 12 (represented in FIG. 1) sweeping it while guaranteeing a good rigidity of the supporting structure, namely the cooling fin 44. Indeed, since the heat pipes are fragile exchangers, the insertion of a large number of heat pipes 9 in the cooling fins 44 can be detrimental to the good rigidity of the cooling fins 44 and make them fragile, or even subject to possible breakages. Furthermore, this spaced-apart disposition also allows the number of heat pipes 9 inserted into the cooling fins 44 to be limited, thus limiting the cost associated with the use of these heat exchangers.

Another advantage to this spaced-apart disposition of the heat pipes 9 in the cooling fins 44 is the adaptability of the cooling device to accommodate a plurality of different heat pipes already available on the market and to not be obliged to adapt a new type of specific heat pipe to the cooling fins 44.

Furthermore, it is also possible to envisage directly modifying tubular heat sinks having fins used in the market and directly introducing heat pipes 9 therein by drilling the fins, for example, in order to obtain the accommodating enclosures 442. In that way, it is possible to limit the cost of production of the cooling device 4 by "recycling" other tubular heat sinks intended to cool the same components.

Figure 3C:
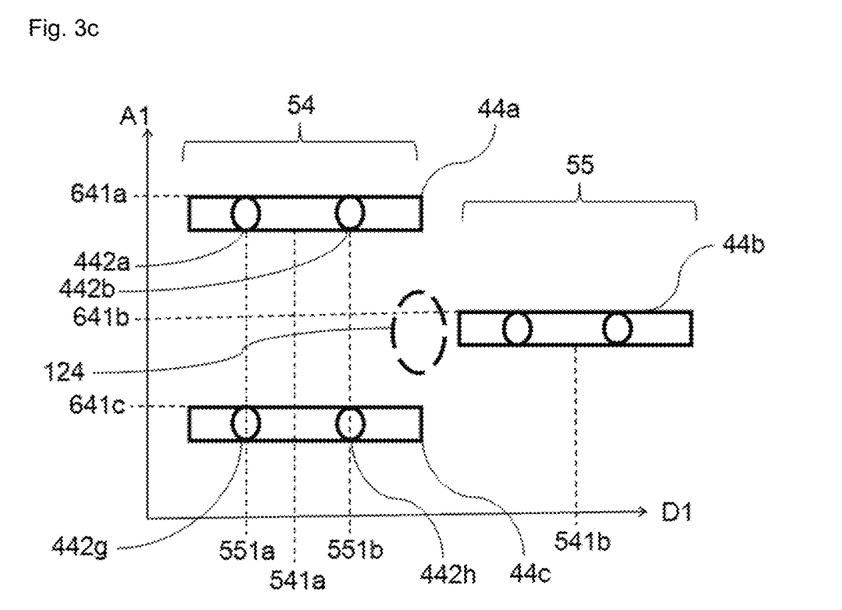
FIG. 3c represents a schematic view of a variant of the second embodiment of the cooling device.

FIG. 3c represents a variant of this second embodiment of the cooling device 4 in which the cooling fins 44 are placed staggered facing the cooling fins 44 which precede them with respect to the flow of air 12. That means that, for two cooling fins 44a and 44c of a row of fins 54 extending along abscissae 541a that are identical in the direction D1 and that each have a distinct ordinate along an axis A1 at right angles to the direction D2 of the plane P1, respectively 641a and 641c, there is a cooling fin 44b of a row of fins 55 characterized by an abscissa 541b and by an ordinate 641b along the axis A1 of the plane P1 which lies between the ordinates 641a and 641c of the cooling fins 44a and 44c of the row of fins 54.

This staggered disposition allows the flow of air 12 to be deflected for each row of fins 54, 55 that the flow of air 12 encounters. In this way, end turbulences 124 are formed, increasing the heat exchanges between the cooling fins 44 and the flow of air 12.

Furthermore, in FIG. 3c, the cooling fins 44a and 44c comprise accommodating enclosures 442a, 442b for the cooling fin 44a and accommodating enclosures 442g, 442h for the cooling fin 44c. Each pair of accommodating enclosures (442a, 442g) and (442b, 442h) is defined by an abscissa 551a for the pair of accommodating enclosures (442a, 442g) and by an abscissa 551b for the pair of accommodating enclosures (442b, 442h). Thus, for cooling fins 44a and 44c extending along one and the same abscissa 541a in the direction D1 and along ordinates 641a and 641c that are different along the axis A1, the heat pipes 9 inserted into the accommodating enclosures 442a and 442g have the same abscissa 551a in the direction D1. Likewise, the heat pipes 9 inserted into the accommodating enclosures 442b and 442h have the same abscissa 551b in the direction D1.

Figure 4A:
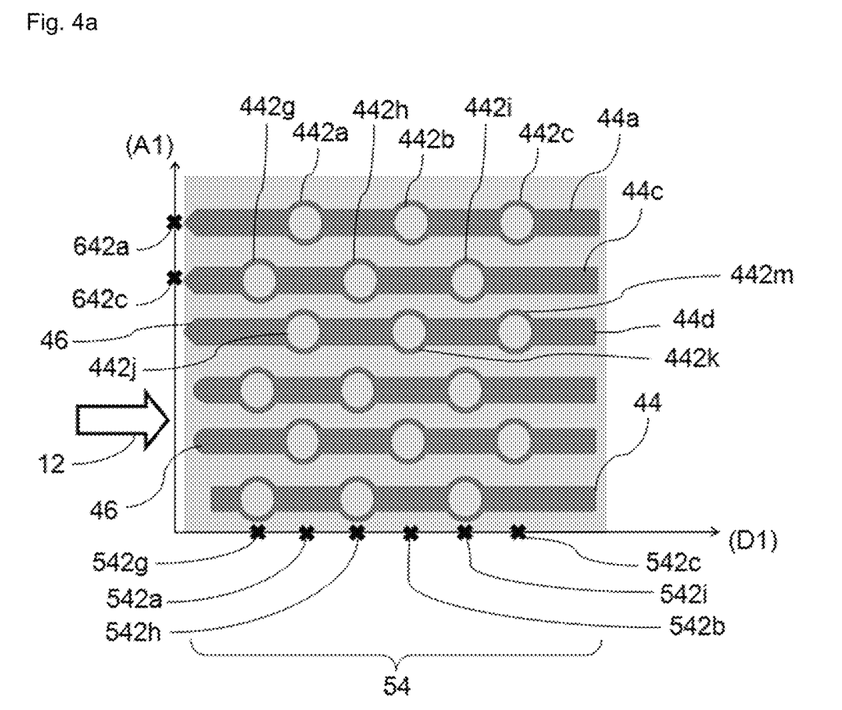
FIGS. 4a and 4b represent a third embodiment of the cooling device.
Figure 4B:
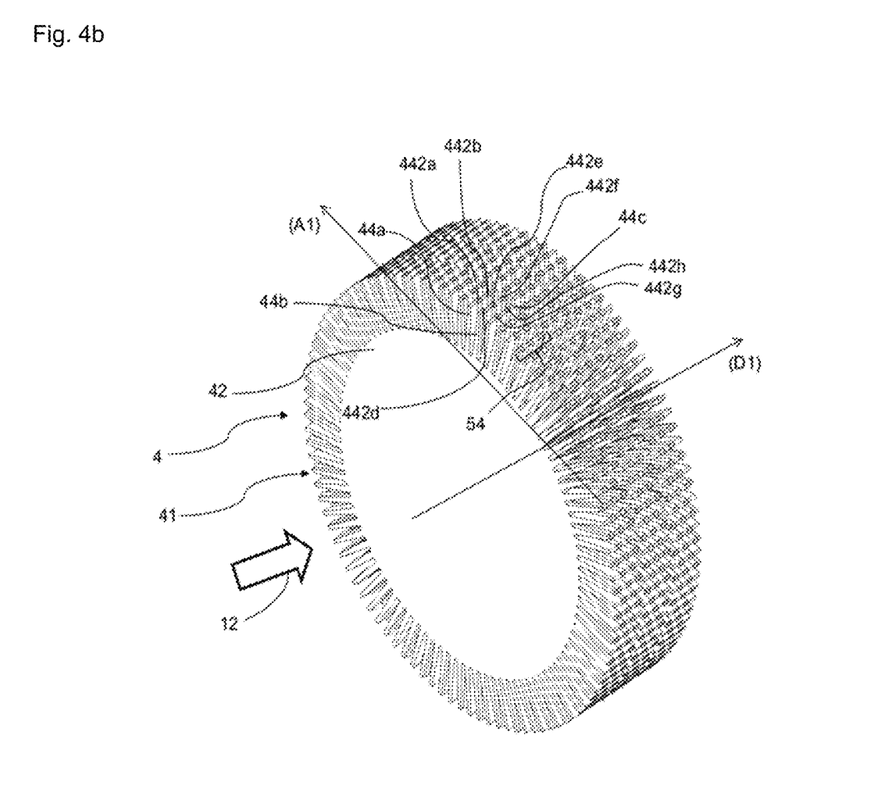

FIGS. 4a and 4b represent a third embodiment of the cooling device 4.

According to this embodiment, the accommodating enclosures 442 of a cooling fin 44 are placed staggered with the accommodating enclosures 442 of the adjacent cooling fins 44 of one and the same row of fins 54.

"Staggered" can be understood to mean that, for the cooling fin 44a of the row of fins 54, the accommodating enclosures 442a, 442b and 442c, which are characterized by an abscissa 542a, 542b, 542c in the direction D1 and by an ordinate 642a on the axis A1 of the plane P1 passing through the cooling fin 44a at right angles to the direction D1, have coordinates in terms of abscissa in the direction D1 and of ordinate on the axis A1 that differ from accommodating enclosures 442g, 442h, 442i of a cooling fin 44c adjacent to the cooling fin 44a in the row of fins 54.

Likewise, the accommodating enclosures 442g, 442h, 442i of the cooling fin 44c, which are characterized by abscissae 542g, 542h, 542i in the direction D1 and by ordinates 642c on the axis A1, have coordinates in terms of abscissa in the direction D1 and of ordinate on the axis A1 that differ from accommodating enclosures 442j, 442k, 442m of a cooling fin 44d adjacent to the cooling fin 44c in the row of fins 54.

This staggered disposition of the accommodating enclosures 442a, 442b, 442c, 442g, 442h, 442i of the cooling fins 44a, 44c allows the flow of air 12 running along the cooling fins 44a, 44c to be regulated by making the speed of the flow of air 12 uniform during the phase of heat exchange between the cooling fins 44 and the flow of air 12.

Furthermore, in all the embodiments, the cooling fins 44 can be provided with reduced sections 46. These reduced sections 46 can take the form of a cone, of a parabola of any eccentricity or any other form promoting the blowing of the flow of air 12 along the cooling fins 44. According to an embodiment, a cooling device having a surface configured to allow the circulation of a heat-transfer fluid along the surface in a first direction (D1), an exchange of heat being able to take place by convection between the cooling device and the fluid, the device comprising n cooling fins, n being an integer greater than or equal to two, each cooling fin forming a protuberance of the device, extending primarily in a plane (P) containing the first direction (D1), in each fin, at least two inserts having a tube form and a dimension characteristic of a section of the tube (D) and extending primarily in a second direction (D2) of the plane (P) distinct from the first direction (D1), the inserts having, over a greater length (L2), a thermal resistance lower than a thermal resistance of the cooling fin along a same length, each insert being distant in the first direction (D1) from another insert by a length equal to or greater than the characteristic dimension of the section of the tube (D) of the insert, wherein, the n cooling fins each comprising at least two inserts, the n cooling fins extend in the first direction (D1) and in a different location along a circumferential direction, the inserts of cooling fins adjacent in the circumferential direction having a location along the first direction offset by a length greater than or equal to the characteristic dimension of the section of the tube (D) of the inserts in the first direction (D1), such that the inserts of a first cooling fin are respectively located circumferentially adjacent to corresponding portions of an adjacent second cooling fin in the circumferential direction, the corresponding portions of the adjacent second cooling fin being devoid of inserts. According to the embodiment, n being an integer greater than or equal to two, wherein ones of the n cooling fins extend along the first direction (D1) at different locations along an axis (A1) of the section (P1) in the circumferential direction, the ones of the inserts having the same location in the first direction (D1).

The invention claimed is:

1. A cooling device having a surface configured to allow the circulation of a heat-transfer fluid along the surface in a first direction (D1), an exchange of heat being able to take place by convection between the cooling device and the fluid, the device comprising:
n cooling fins, n being an integer greater than or equal to two, each cooling fin forming a protuberance of the device, extending primarily in a plane (P) containing the first direction (D1),
in each fin, at least two inserts having a tube form and a dimension characteristic of a section of the tube (D) and extending primarily in a second direction (D2) of the plane (P) distinct from the first direction (D1), the inserts having, over a greater length (L2), a thermal resistance lower than a thermal resistance of the cooling fin along a same length,
each insert being distant in the first direction (D1) from another insert by a length equal to or greater than the characteristic dimension of the section of the tube (D) of the insert, wherein, the n cooling fins each comprising at least two inserts, the n cooling fins extend in the first direction (D1) and in a different location along a circumferential direction, the inserts of cooling fins adjacent in the circumferential direction having a location along the first direction offset by a length greater than or equal to the characteristic dimension of the section of the tube (D) of the inserts in the first direction (D1), such that the inserts of a first cooling fin are respectively located circumferentially adjacent to corresponding portions of an adjacent second cooling fin in the circumferential direction, the corresponding portions of the adjacent second cooling fin being devoid of inserts.

2. The cooling device according to claim 1, wherein the tube form of the inserts extends in a third direction (D3) of the tube and wherein the inserts are embedded in the corresponding cooling fin over a greater proportion of their length in the third direction (D3) of the tube.

3. The cooling device according to claim 1, wherein the inserts are heat pipes.

4. The cooling device according to claim 1, wherein the characteristic dimension of the section of the tube (D) of the insert is greater than a thickness (E) of the corresponding cooling fin defined outside of a section (P1) of the cooling fin at right angles to the first direction (D1) and passing through the insert.

5. The cooling device according to claim 4, n being an integer greater than or equal to two, wherein ones of the n cooling fins extend along the first direction (D1) at different locations along an axis (A1) of the section (P1) in the circumferential direction, the ones of the inserts having the same location in the first direction (D1).

6. The cooling device according to claim 1, wherein each insert is embedded in a cooling fin accommodating it.

7. The cooling device according to claim 1, wherein the greater length (L2) of each insert is equal to or greater than a greater length (L) of a respective cooling fin in a section (P1) of the cooling fin at right angles to the first direction (D1).

8. The cooling device according to claim 1, wherein each cooling fin has a smaller section at an end.

9. The cooling device according to claim 1, n being an integer greater than or equal to two, wherein several of the n cooling fins are aligned in the first direction (D1).

10. The cooling device according to claim 1, wherein a thermal grease is applied between each insert and a corresponding cooling fin.

11. An electrical machine comprising a field frame on which windings bear and equipped with the cooling device according to claim 1.

* * * * *